Figure 1:
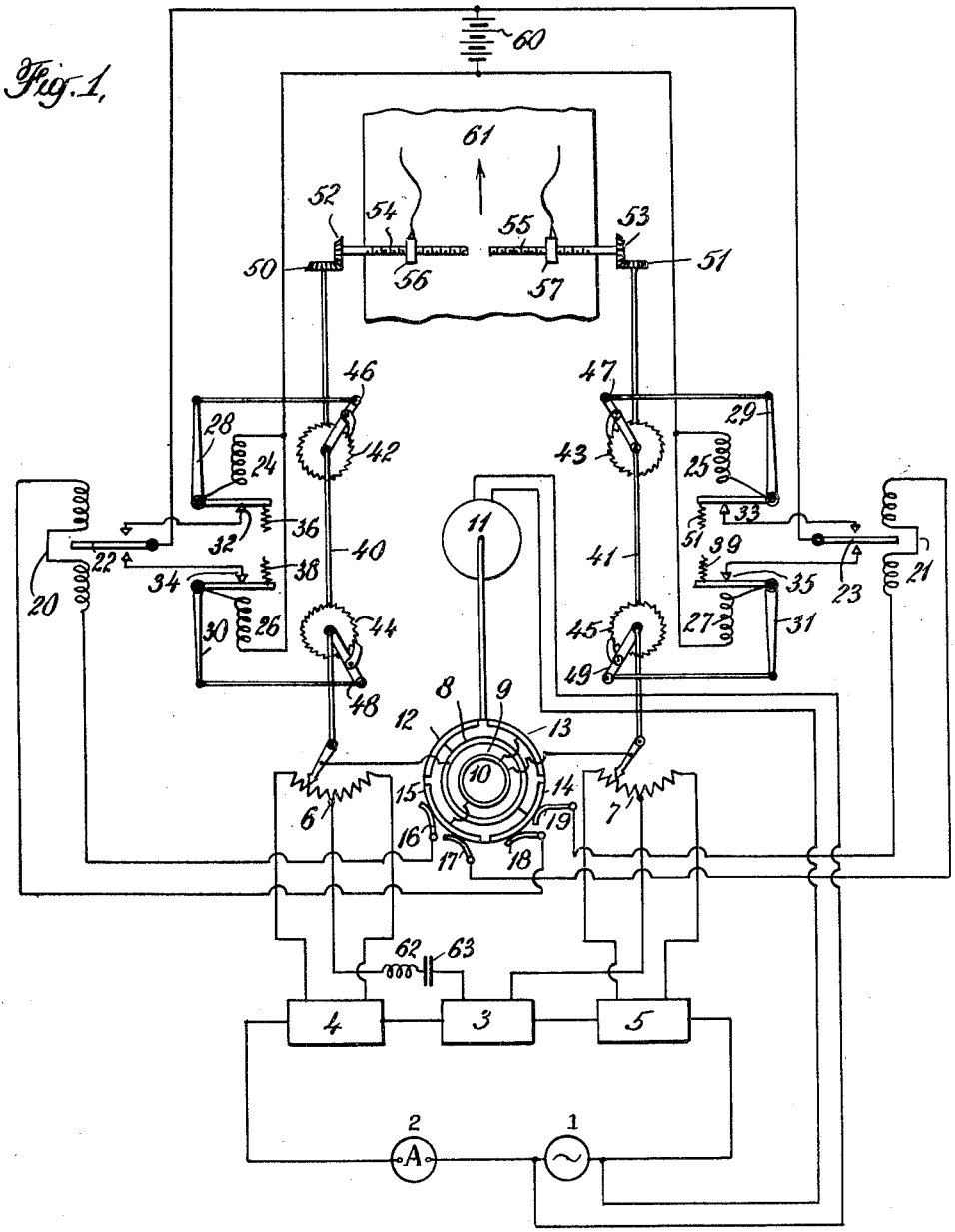

May 17, 1938.  T. ZUSCHLAG  2,117,390
COMPENSATION OF ALTERNATING CURRENT FLUCTUATIONS
Filed July 12, 1934  3 Sheets-Sheet 1

INVENTOR
Theodor Zuschlag
BY
Pennie, Davis, Marvin and Edmonds
ATTORNEYS

May 17, 1938. T. ZUSCHLAG 2,117,390
COMPENSATION OF ALTERNATING CURRENT FLUCTUATIONS
Filed July 12, 1934 3 Sheets-Sheet 2

INVENTOR
Theodor Zuschlag
BY
ATTORNEYS

May 17, 1938.　　　T. ZUSCHLAG　　　2,117,390
COMPENSATION OF ALTERNATING CURRENT FLUCTUATIONS
Filed July 12, 1934　　　3 Sheets-Sheet 3

INVENTOR
Theodor Zuschlag
BY
ATTORNEYS

Patented May 17, 1938

2,117,390

UNITED STATES PATENT OFFICE 2,117,390

COMPENSATION OF ALTERNATING CURRENT FLUCTUATIONS

Theodor Zuschlag, Englewood, N. J., assignor to Magnetic Analysis Corporation, Long Island City, N. Y., a corporation of New York Application July 12, 1934, Serial No. 734,713

11 Claims. (Cl. 175—182)

This invention relates to electrical analysis and has for an object improvements in the determination of the characteristics of electrical currents. More specifically the invention contemplates improvements in methods of and apparatus for determining and compensating for fluctuations in alternating current. In one of its aspects the invention contemplates the automatic compensation and recording of fluctuations in an alternating current network.

In the heretofore customary art of electrical analysis fluctuations in the amplitude and other characteristics of alternating current have been automatically recorded, and automatic apparatus for the compensation of amplitude variations in alternating current circuits have been developed. These apparatus, however, fall far short of complete automatic compensation of fluctuations in both phase and amplitude of alternating current flowing in a circuit, though this result is often desirable in many industrial applications of alternating current.

As a result of my investigations, I have discovered that complete automatic compensation of fluctuations in alternating current may be accomplished with respect to both amplitude and phase. If desired, a continuous record of the fluctuations may be made simultaneously. My present invention utilizes the principles of and is an improvement over the method set forth in my copending application Serial No. 716,940, filed March 23, 1934 and the multiple component indicating apparatus described in my copending application Serial No. 716,941, filed March 23, 1934. These have matured into Patents No. 2,079,645, March 11, 1937 and 2,082,997, June 8, 1937, respectively.

According to the practice of my invention, alternating current to be compensated is broken up into multiple components displaced from each other by a constant phase angle. These phase displaced components are utilized to actuate a mechanism whereby auxiliary potentials are automatically regulated and introduced into a circuit through which the alternating current to be compensated is flowing. The auxiliary potentials thus introduced serve to compensate not only for variations in amplitude, but also for variations in phase. I have found it expedient to break the alternating current into 90° components, but it is of course possible to utilize components displaced from each other or measured by other constant phase angles. Since my invention permits compensation of both amplitude and phase variations, it makes possible the complete automatic operation of alternating current networks, and at the same time offers means whereby a visual record of the regulation may be obtained.

Alternating current networks are in such widespread use that an enumeration of all the possible specific applications of my invention is difficult. It should be noted, however, that in the fields of electrical prospecting and of magnetic analysis my invention offers outstanding advantages.

My invention will be better understood by reference to the following description, taken in conjunction with the accompanying drawings, in which Fig. 1 is a schematic representation of a form of automatic compensating and recording apparatus of my invention in an alternating current circuit.

Figure 2:
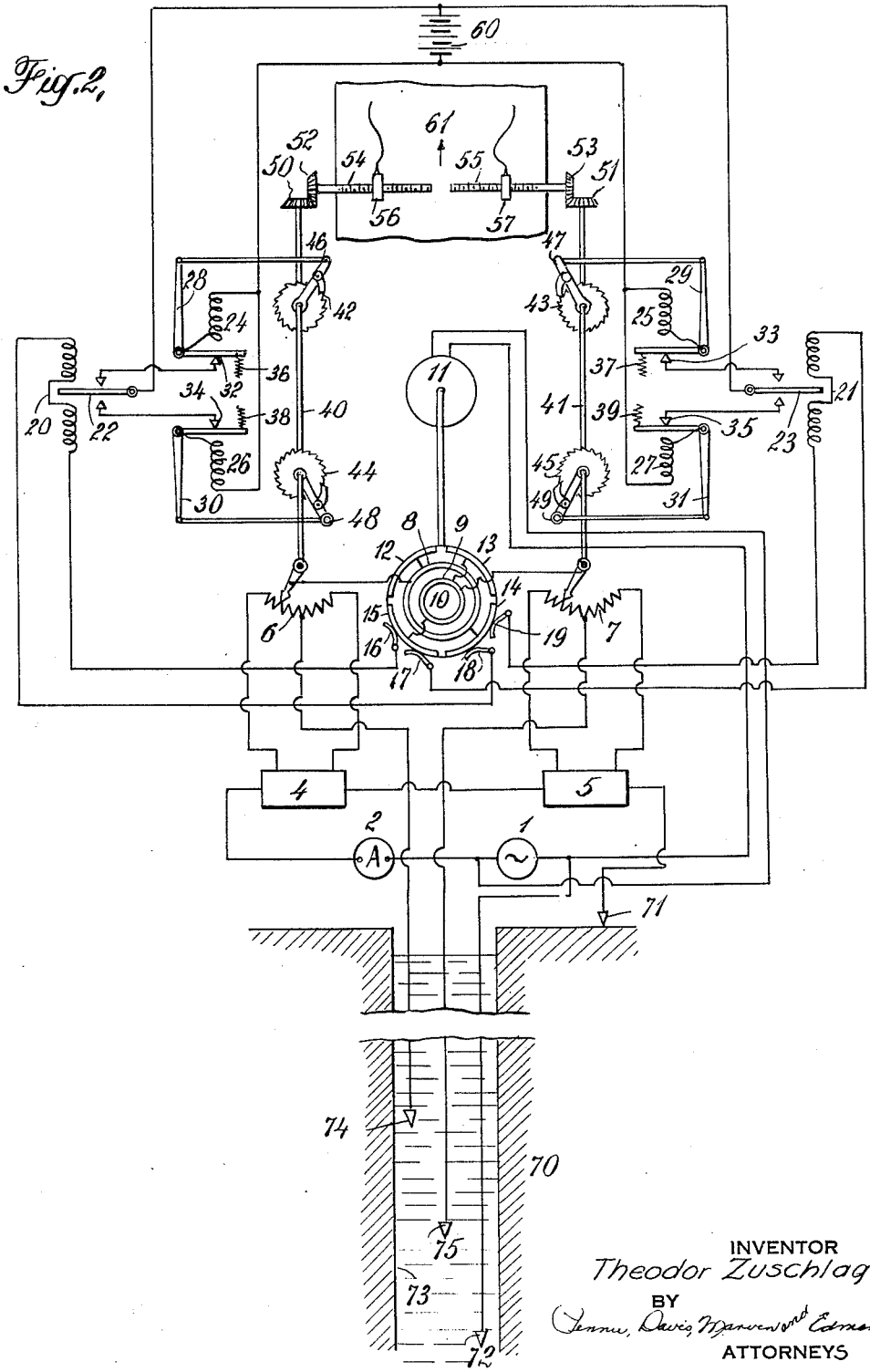
Figure 3:
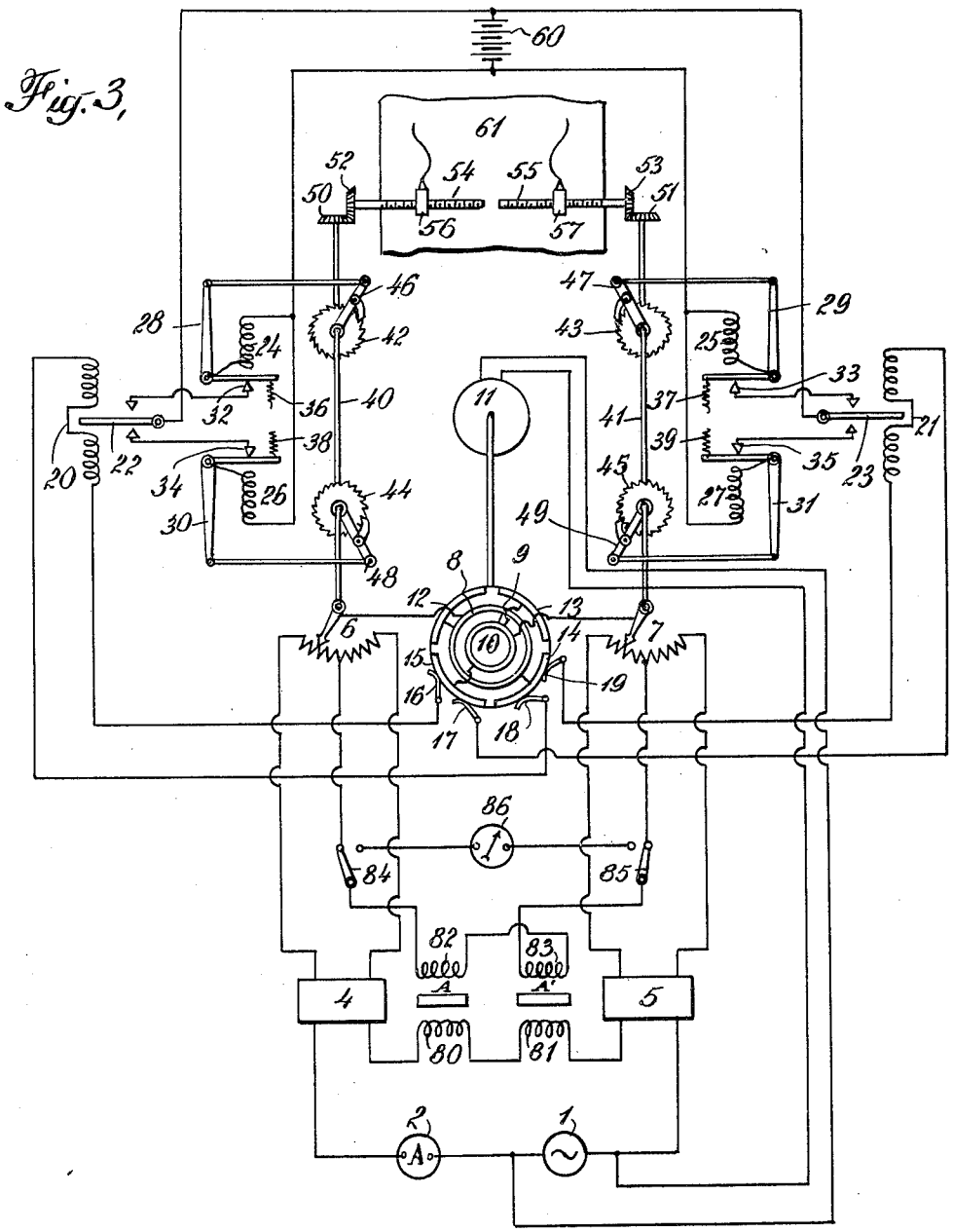

Fig. 2 represents an application of an automatic compensator and recorder of my invention in an electrical prospecting apparatus; and Fig. 3 is a schematic representation of a magnetic anaysis circuit into which an automatic compensator and recorder of my invention have been incorporated.

Referring to Fig. 1, it will be seen that an alternating current source I is connected in series with an ammeter 2, a variable energy consumer 3, the output potential of which is to be compensated, and auxiliary potential sources 4 and 5, such as transformers. The load 3 may be any electrical energy consumer which causes a fluctuation in the potential impressed across its output teminals, for example, a transformer. The apparatus, however, is not limited in its application to the compensation of fluctuation in a secondary electromotive force, as will presently appear. The auxiliary potential source 4 is arranged to furnish an auxiliary potential in phase with the potential of the circuit I, 2, 4, 3, 5, while the auxiliary potential source 5 supplies an auxiliary potential which is 90° out of phase with the potential of the main circuit I, 2, 4, 3, 5. The output terminals of the sources of auxiliary potential 4 and 5 are connected respectively to the end points of a pair of potentiometers 6 and 7, these potentiometers being provided with center taps and movable sliders. The center taps of the two potentiometers are connected to the output terminals of the energy consumer 3, the potential of which is to be analyzed, recorded and compensated. The sliders of the two potentiometers are electrically connected respectively with slip rings 8 and 9 of a synchronous commutator 10, which is fixed to the shaft of a synchronous motor 11. The synchronous motor preferably derives its power from the current source 1, as shown. Slip ring 8 of the commutator is connected to two diametrically opposed contact segments 12 and 14 of the commutator, while slip ring 9 of the commutator is connected with another pair of contact segments 13 and 15, which are also diametrically opposed and positioned around the axis of the commutator between contact segments 12 and 14. When the commutator is rotated the contact segments contact successively with two pairs of brushes 16, 18 and 17, 19, which are mounted around the periphery of the commutator in such a way that brushes 16 and 17 are in contact with segment 15 when brushes 18 and 20 are in contact with segment 14. The brush pairs 16, 18 and 17, 19 are connected in series respectively with the coils of galvanometer relays 20 and 21.

The galvanometer relays 20 and 21 are provided with moving arms 22 and 23. Each moving arm is connected in parallel with the coils of a pair of control relays 24, 26 and 25, 27, through a direct current source 50. The direct current source may be of any convenient form, such as a battery of dry cells strong enough to actuate the moving parts of the control relays.

The free ends of the coils of control relays 24, 25, 26 and 27 are connected to their respective moving arms 28, 29, 30 and 31, the latter being normally pressed against their respective contact points 32, 33, 34, and 35 by springs 36, 37, 38 and 39. Contact points 32 and 34 of control relays 24 and 26 are connected respectively to the contact points of the galvanometer relay 20 on either side of its moving arm. Similarly, contact points 33 and 35 of control relays 25 and 27 are connected to the contact points of the galvanometer relay 21.

The slider of potentiometer 6 is mechanically fastened to the end of a rotatable control shaft 40, upon which are mounted two ratchet wheels 42 and 44. Pawl mechanism 46 and 48 are arranged to operatively engage ratchet wheels 42 and 44 respectively, and are thus connected respectively with moving arms 28 and 30 of the control relays 24 and 26. The ratchet wheels 42, 44 are rotatably mounted on the control shaft and are free to turn thereon except when the respective pawl mechanisms 46, 48 are called into operation by the respective control relays 24, 26 at which time the wheels become fixed to the control shaft through the action of magnetic clutches (not shown) or the like to which power is supplied when the respective control relays become energized. This prevents the pawl mechanisms from working against each other. Similarly, the slider of potentiometer 7 is fastened to control shaft 41 bearing the ratchet wheels 43 and 45 which are connected respectively with moving arms 29 and 30 of control relays 25 and 27 by means of pawl mechanisms 47 and 49.

At the end of the control shaft 40 remote from the potentiometer slide a mitre gear 50 is rigidly mounted. This gear engages a similar mitre gear 52 mounted on the end of a rotatable threaded indicator shaft 54 positioned at right angles to the control shaft 40. A pen 56 is mounted on the threaded indicator shaft in such a way that the revolution of the shaft causes the pen holder to move longitudinally along the indicator shaft and trace a record of its successive positions upon the movable chart 61, which is movable in a direction at right angles to the major axis of the indicator shaft by a mechanism not shown. In like manner an end of the control shaft 41 is operatively connected with an indicator shaft 55 by means of mitre gears 51 and 53, and a pen 57 mounted on the threaded indicator shaft 55 traces a record of its successive positions on the chart 61.

The operation of the apparatus shown in Fig. 1 may be described as follows:

Assuming the sliders of potentiometers 6 and 7 to be in contact with their respective center taps, any potential imposed across the output terminals of the variable energy consumer 3 will be transmitted directly to the slip rings of the commutator and there broken up and rectified into two 90° phase displaced components. The rectified components of the potential, if any, will be transmitted to galvanometer relays 20 and 21. The energizing of the galvanometer relays by the components of the potential will cause the moving arms of the relays to close the direct current circuit through the control relays. The direct current will then energize the control relays and cause them to pull the moving arms of the control relays and the operatively connected pawl mechanisms so as to cause a slight rotation of the control shafts 40 and 41. The rotation of the control shafts will move the sliders of potentiometers 6 and 7 and also will shift the position of the penholders 56 and 57. It will be observed that the ratchet wheels 42, 44, 43 and 45 and the pawl mechanisms 46, 47, 48 and 49 are so constructed that the direction of rotation of the potentiometer sliders tends to oppose a change in potential drop resultant from a variation in the energy consumption of the element 3. On the other hand, any movement of the moving arms of the control relays interrupts at once the current flow in the control circuits and the springs 36, 38, 37 and 39 force the moving arms and the pawl mechanisms of the control relays back to the starting position. This play of forces repeats itself until the compensating voltages of the potentiometers equal the potential drop of load 3. When this condition has been attained the energization of the galvanometer relays ceases, and the moving arms of these relays return to their neutral zero center position, thereby breaking the circuit of the control relays and terminating the energization of the control relays and the rotation of the control shafts. It will be apparent that the amount of rotation of the control shaft is continuously recorded by pens 56 and 57 upon the moving chart 61.

In other words, the alternating current flowing in the circuit 3, 6, 10, 7, 3 is broken into two components displaced from each other by a phase angle of 90°. These components are rectified and introduced into circuits 16, 20, 18 and 17, 21, 19 respectively. Now considering circuit 16, 20, 18, the rectified component flowing therein will cause the moving arm 22 of the galvanometer relay to contact with one or the other of the adjacent points of the galvanometer relay 20, depending upon polarity. Assuming the upper point to be contacted the coil of control relay 24 will be energized and under the influence of the energized coil, the moving arm 28 will push the ratchet wheel 46 clockwise and move the slider of potentiometer 6 away from the center point. The setting of potentiometer 6 is thus changed to permit the introduction of a different amount of auxiliary alternating current from the auxiliary source 4 into the main circuit 3, 6, 10, 7, 3. If the auxiliary current thus introduced is sufficient, it will compensate for its respective component in circuit 16, 20, 18, and this component will be substantially zero, so that no further energization of the relays 20, 24 and 26 will occur. The operation of the other half of the control mechanism comprising the circuit 17, 21, 19, relays 25 and 27, and the ratchet-shaft mechanism 41, 43, 45 is similar, except that it automatically compensates for the other rectified component of the current. The final result is that auxiliary potenials corresponding in phase to the original phase of the rectified components are introduced into circuit 3, 6, 10, 7, 3 in amount to completely compensate for the potential imposed across this circuit from the energy consumer 3.

Variations in the two rectified components are recorded by pens 56 and 57, and a complete and continuous record of these variations may thus be obtained if desired. The compensation will, of course, be accomplished by my invention whether or not such record of the variations is made, but in many industrial applications, for example in electrical prospecting or magnetic analysis, such a record is desirable.

It is not necessary in order to start the operation of the automatic recording device that the sliders of the potentiometers be in contact with their center taps. The apparatus is so constructed that it will start automatic operation from any initial position of the sliders.

In the event that the analysis and compensation of a single harmonic of the alternating current is desired, the structure may be modified to include a suitable filter in the circuit between the variable load and the slip rings of the commutator. Several forms of filters may be employed, among them a suitable inductance 62 in series with a suitable capacitance 63, as shown in Fig. 1.

While I have described my invention with reference to the analysis of an alternating current potential with two 90° phase displaced components, the same principle may be employed in the construction of an automatic compensation device in which the alternating current is analyzed into other components displaced from each other by constant phase angles other than 90°. I have found, however, that for most practical purposes, the breaking up of the current into two 90° phase displaced components offers the advantage of simple construction of the compensating device and permits complete compensation of the variations of phase and amplitude, so that analysis of the potential into more than two components is unnecessary.

With respect to the auxiliary potential sources 4 and 5, it should be noted that these sources need not be necessarily derivative from the primary source of alternating current 1. Any suitable source of auxiliary potential may be chosen as long as the potential imposed across the output terminals of the auxiliary source of potential 4 is substantially 90° out of phase with the potential across the output terminals of the variable energy consumer 3, and as long as the potential imposed across the output terminals of the auxiliary potential source 5 is substantially in phase with that imposed across the output terminals of the energy consumer. Similarly, it should be noted that the currents supplied to the synchronous motor 11 need not be derived necessarily from the primary alternating current source 1, although this is a convenient system. All that is required is that the commutator 10 be rotated in synchronism with the cycles of the alternating current imposed across the output terminals of the energy consumer 3.

Referring now to Fig. 2, which illustrates an embodiment of an automatic compensator and recorder of my invention in an electrical prospecting device, it will be seen that a source of alternating current 1 is connected in series with an ammeter 2, auxiliary potential sources 4 and 5 and the ground 70 through the field electrodes 71 and 72. Field electrode 71 is in contact with the surface of the ground while field electrode 72 is placed within a drill hole 73. The drill hole is substantially filled with a thin mud. Exploration electrodes 74 and 75 are also inserted within the drill hole at points between the location of field electrode 72 and the surface of the ground. The exploration electrodes 74 and 75 represent the output terminals of the energy consumer as shown in Fig. 1 and are connected to the center taps of the potentiometers 6 and 7. The remainder of the device is substantially identical with that shown in Fig. 1 and comprises the center tap potentiometers 6 and 7, the synchronous commutator 10, the galvanometer relays 20 and 21, the control relays 24, 25, 26 and 27, the ratchet wheels 42, 43, 44 and 45, the pawl mechanisms 46, 47, 48 and 49, the control shafts 40 and 41, the indicator shafts 54 and 55, the pen holders 56 and 57, the movable chart 61, the source of direct current 60 and a synchronous motor 11.

The operation of the electrical prospecting device which includes my automatic recording and compensating mechanism may be described as follows:

In a terrain, the subterranean nature of which is to be investigated, a drill hole is sunk by any of the approved methods, such as diamond drilling or churn drilling. The thin mud that has been utilized to move the comminuted rock during the drilling operation is left in the hole. The apparatus is moved to the scene of exploration and the field electrode 71 is fixed into the ground near the top of the drill hole. The field electrode 72 on the end of an insulated cable is then lowered to a predetermined depth within the drill hole. The exploration electrodes 74 and 75 on the ends of insulated cables, are lowered gradually into the drill hole in spaced relationship to each other. A current flows between field electrodes 71 and 72 and through the surrounding earth so that a difference in potential is set up between the exploration electrodes 74 and 75. As the exploration electrodes are lowered into the hole, the potential set up across them changes, due to resistivity variations in the ground around the drill hole. The compensating mechanism tends to compensate for any potential imposed across the exploration electrodes 74 and 75 and automatically records any changes in this potential. In consequence, the mechanism affords a continuous and complete record of all changes in potential across electrodes 74 and 75 as they are lowered into the drill hole. This record of changing potential across the exploration electrodes may be interpreted by means well known in the art to predict the subterranean character of the terrain surrounding the drill hole. It will be obvious that this automatic mechanism presents outstanding advantages in the case of alternating current electrical prospecting traverses which were formerly made by manual regulation of the apparatus during the period when the exploration electrodes were lowered into the hole. In the heretofore customary art of alternating current electrical prospecting of drill holes, it was necessary to lower the exploration electrodes in periodic steps, stopping the cables at frequent intervals in order that an accurate compensation could be made by manual adjustment of the apparatus. This is completely eliminated when automatic compensation is employed and the procedure is made more rapid, less cumbersome and more accurate in that a continuous record of the traverse is now possible where formerly only the potiential of a series of isolated points was known.

Fig. 3 represents an adaptation of automatic compensating and recording mechanism of my invention to a magnetic analysis apparatus. Referring to Fig. 3 it will be seen that an alternating current source 1 is connected in series with an auxiliary potential source 4, an ammeter 2, primary coils 80 and 81 and auxiliary potential source 5. Secondary coils 82 and 83 of the magnetic analysis device are placed in inductive relationship respectively with primary coils 80 and 81 and are connected in series opposition with the two double throw switches 84 and 85. One pole of each of these switches is connected to the center tap respectively of potentiometers 6 and 7. The other poles of the switches 84 and 85 are connected with a potential indicating device 86. The remainder of the apparatus of Fig. 3 is substantially the same as that shown in Fig. 1, comprising two potentiometers, a synchronous commutator, galvanometer relays, control relays, control shafts, pawl mechanism, ratchet wheels, a synchronous motor, a source of direct current, and a recording mechanism. The recording mechanism is not essential in this instance, since it is not always necessary to have a record of the preliminary compensation of a magnetic analysis apparatus.

The operation of this apparatus may be explained as follows: Substantially identical magnetizable bodies A and A', usually known as standards are inserted respectively in the fields of the coil combinations 80, 82 and 81, 83. In commercial magnetic analyses apparatus, unsymmetrical arrangement of apparatus and other factors often tend to impose a so-called false potential in the secondary circuit which is not representative of magnetic differences between the magnetizable bodies undergoing comparison. The switches 84 and 85 are accordingly closed upon the contact points leading to the center taps of the two potentiometers 6 and 7 and the mechanism then automatically compensates for any so-called false potential differences which may be present in the circuit. As soon as compensation has been effected, the switches are simultaneously shifted so that a secondary current imposed across coils 82 and 83 flows through the indicator 86. After the circuit has been automatically compensated so that no current flows therein one of the standards A and A' is replaced by a magnetizable specimen to be tested and the resulting potential difference is measured on the indicator 86. This potential difference may be interpreted by means well known in the art to indicate differences between the physical or metallurgical properties of the specimen and the standard.

In the heretofore customary art of magnetic analysis, this preliminary compensation of the secondary circuit has been accomplished by manual regulation, a slower and cumbersome procedure requiring considerable operative skill. It will be apparent that this manual regulation is completely dispensed with in the practice of magnetic analysis with the automatic apparatus of my invention. In consequence, much more rapid analysis of metallurgical specimens is possible, while relatively unskilled labor may be employed.

The automatic compensating apparatus of my invention may also be combined with the magnetic analysis apparatus disclosed in my copending application, Serial No. 716,942, filed March 23, 1934, or the method of magnetic analysis described in my copending application, Serial No. 716,943, filed March 23, 1934, now Patents No. 2,077,161, April 13, 1937, and No. 2,056,996, October 13, 1936, respectively.

As has been noted, the output potential which is analyzed by the commutator of auxiliary potential may be either a primary or a secondary current. Thus in the case of the electrical prospecting device shown in Fig. 2, the potential which is measured is a primary one, whereas in the magnetic analysis device shown by Fig. 3, the output potential which is analyzed and compensated for is a secondary potential imposed across opposed secondary coils of a comparative magnetic analysis apparatus. Many other applications of this automatic compensating mechanism and method for both primary and secondary currents will undoubtedly occur to men skilled in the art.

While I have described my invention with reference to a particular type of structure, it will be apparent that many refinements and adaptations will occur to the man skilled in the art, without departing from the basic principles of my invention.

I claim:

1. Apparatus for automatically compensating for fluctuations in alternating current which comprises, a source of alternating current to be compensated, a plurality of sources of auxiliary alternating potential, a synchronous commutator adapted to break up the alternating current into a plurality of components displaced from each other by constant phase angles and connected with the source of alternating current to be compensated through the sliders of a plurality of center tap potentiometers, the endpoints of said potentiometers being connected to the sources of auxiliary alternating potential, means for rotating said commutator in synchronism with the alternating current to be compensated, and means mechanically connected with the sliders of the potentiometers and electrically connected to the commutator and adapted to move said sliders in response to variations in the phase displaced components of the alternating current to be compensated.

2. Apparatus for automatically compensating for fluctuations in alternating current which comprises, a synchronous commutator adapted to break up the alternating current into two 90° phase displaced components, a source of alternating current to be compensated, an auxiliary source of alternating electrical potential in phase with the current to be compensated, an auxiliary source of electrical potential 90° out of phase with the current to be analyzed, two potentiometers each having a movable slider and connected with the commutator and with a source of auxiliary potential, and means for moving said sliders of the potentiometers in response to variations of the 90° phase displaced components of the alternating current.

3. Apparatus for automatically analyzing and compensating for fluctuations in alternating current which comprises, a source of alternating current to be analyzed, a commutator adapted to break up the alternating current to be compensated into two 90° phase displaced components, an auxiliary source of alternating electrical potential 90° out of phase with the current to be analyzed, another auxiliary source of alternating electrical potential in phase with the current to be analyzed, two center tap potentiometers the end points of which are connected respectively to the two auxiliary sources of electrical potential, the commutator being connected with the source of alternating current to be analyzed through the endpoints and center taps of the potentiometers, means for rotating the commutator in synchronism with the cycles of the alternating current to be analyzed, and means mechanically connected with the sliders of the potentiometers and electrically connected with the commutator for automatically moving the sliders of the potentiometers in response to changes in the 90° phase displaced components of the alternating current to be analyzed.

4. Apparatus according to claim 3 in which the means for automatically moving the potentiometer sliders comprise galvanometer relays the coils of which are electrically connected with the commutator, and control relays connected to a source of direct current and adapted to cooperate with the galvanometer relays in the movement of the potentiometer sliders.

5. Apparatus for automatically compensating for fluctuations in alternating current which comprises, a source of alternating current to be compensated, an auxiliary source of alternating electrical potential in phase with the current to be compensated, another auxiliary source of alternating electrical potential 90° out of phase with the current to be compensated, a synchronous commutator adapted to break up the alternating current into two 90° phase displaced components, a pair of center tap potentiometers having their center taps connected with the source of alternating currents to be compensated, their sliders connected with the commutator and their endpoints connected with one of the sources of auxiliary alternating electrical potential, and means for automatically moving said sliders in response to variations in the 90° phase displaced components of the alternating current.

6. Apparatus according to the preceding claim in which the synchronous commutator is mechanically connected with a synchronous motor which derives its power from the source of alternating current to be compensated.

7. Apparatus for automatically compensating for fluctuations in alternating current which comprises, a source of alternating current connected with a transformer adapted to deliver a secondary electrical potential substantially 90° out of phase with the alternating current source and also connected with an electrical energy consumer and with a transformer adapted to deliver a secondary electrical potential substantially in phase with said alternating current source, a synchronous commutator adapted to break up an alternating current into two 90° phase displaced components, a pair of center tap potentiometers each of which is connected through its endpoints to the secondary coils of one of the transformers, said potentiometers also being connected to the commutator and to the energy consumer, and means whereby the sliders of the potentiometers are automatically moved in response to variations in the 90° phase displaced components from the commutator.

8. Apparatus for automatically recording and compensating for fluctuations in an alternating current which comprises, a commutator adapted to break up the alternating current into two components displaced from each other by constant phase angles, two potentiometers having movable sliders and connectable with the commutator and with auxiliary sources of alternating electrical potential, means mechanically connected with said sliders and electrically connected with said commutator and adapted to automatically move said sliders in response to a variation in the phase displaced components of the alternating current, and means for automatically recording said movements of the sliders.

9. Apparatus according to claim 8 in which the means for automatically moving the potentiometer sliders comprise a pair of galvanometer relays connected with the synchronous commutator, a plurality of control relays connectable with a direct current source, and a plurality of pawl mechanisms and ratchet wheels operatively associated with the potentiometer sliders.

10. Apparatus for automatically compensating for fluctuations in alternating current which comprises a circuit adapted to carry the alternating current, a synchronous commutator connected in the circuit and adapted to break up the alternating current into a plurality of phased displaced components, a potentiometer connected in the circuit, means for introducing an auxiliary current into the circuit through the potentiometer, and means mechanically connected with the potentiometer and electrically connected with the commutator for automatically moving a slider of the potentiometer in response to changes in a phase displaced component of the alternating current.

11. Apparatus for automatically compensating for fluctuations in alternating current which comprises a circuit adapted to carry the alternating current, a synchronous commutator connected in the circuit and adapted to break up the alternating current into a plurality of components displaced from each other by constant phase angles, a plurality of potentiometers having movable sliders connected in the circuit, means for introducing auxiliary currents into the circuit through the potentiometers and means for moving the sliders of the potentiometers in response to variations in the phase displaced components of the alternating current.

THEODOR ZUSCHLAG.